(12) United States Patent
Jarrett et al.

(10) Patent No.: US 7,117,909 B2
(45) Date of Patent: Oct. 10, 2006

(54) EXPANDABLE SPINDLE PLUG ASSEMBLY FOR USE WITH AUTOMATIC TIRE INFLATION SYSTEMS

(75) Inventors: Larry G. Jarrett, Perry, OK (US); Johnathan G. Jones, Edmond, OK (US)

(73) Assignee: Airgo IP, LLC, Edmond, OK (US)

( * ) Notice: Subject to any disclaimer, the term of this patent is extended or adjusted under 35 U.S.C. 154(b) by 191 days.

(21) Appl. No.: 10/941,774

(22) Filed: Sep. 15, 2004

(65) Prior Publication Data

US 2005/0115655 A1 Jun. 2, 2005

Related U.S. Application Data

(63) Continuation-in-part of application No. 10/457,793, filed on Jun. 9, 2003, now Pat. No. 6,938,658.

(51) Int. Cl.
*B60C 23/10* (2006.01)

(52) U.S. Cl. .................. 152/416; 301/124.1; 403/369

(58) Field of Classification Search ............. 152/415, 152/416, 417; 403/366, 367, 368, 369, 370; 301/124.1, 108.1
See application file for complete search history.

(56) References Cited

U.S. PATENT DOCUMENTS

| | | | |
|---|---|---|---|
| 3,847,493 A | 11/1974 | Peter et al. | |
| 5,377,736 A | 1/1995 | Stech | |
| 5,492,393 A | 2/1996 | Peisker et al. | |
| 5,538,330 A | 7/1996 | Ehrlich | |
| 5,584,949 A | 12/1996 | Ingram | |
| 5,752,746 A | 5/1998 | Perry | |
| 5,769,979 A * | 6/1998 | Naedler | 152/417 |
| 5,860,708 A | 1/1999 | Borders et al. | |
| 6,024,417 A | 2/2000 | Jones, II et al. | |
| 6,105,645 A | 8/2000 | Ingram | |
| 6,131,631 A | 10/2000 | Bradley et al. | |
| 6,269,691 B1 * | 8/2001 | Sowatzke et al. | 73/146.2 |
| 6,325,463 B1 | 12/2001 | Sitter et al. | |
| 6,394,556 B1 | 5/2002 | Ingram | |
| 6,484,774 B1 | 11/2002 | Naedler | |
| 6,527,472 B1 | 3/2003 | Varnai | |
| 6,698,482 B1 * | 3/2004 | Hennig et al. | 152/417 |
| 6,892,778 B1 * | 5/2005 | Hennig et al. | 152/415 |
| 6,938,658 B1 * | 9/2005 | Jarrett et al. | 152/416 |

FOREIGN PATENT DOCUMENTS

| | | |
|---|---|---|
| FR | 2678030 | 12/1992 |
| JP | 61-153017 | 11/1986 |
| JP | 61-149615 | 8/1996 |

* cited by examiner

*Primary Examiner*—Russell D. Stormer
(74) *Attorney, Agent, or Firm*—Holland & Knight LLP

(57) ABSTRACT

An assembly to be mounted in an axle spindle for communicating pressurized air to a rotary union in a tire inflation system. The assembly includes an arbor having an air flow channel extending therethrough, a flange intermediary of the arbor ends and an axially inclined portion proximate the flange. A sealing member is carried by the flange for forming a seal with the axle spindle. A split ring locking assembly is disposed about the inclined portion of the arbor that is comprised of a plurality of segments held by an expansible retention spring. The segments move radially outwardly upon the locking assembly being moved along the inclined arbor portion and engage the axle spindle, securing the plug assembly within the spindle. A fastening member threadably engages the arbor for urging the locking assembly along the inclined arbor portion to effect securement of the plug assembly within the axle spindle.

42 Claims, 6 Drawing Sheets

Fig. 11

EXPANDABLE SPINDLE PLUG ASSEMBLY FOR USE WITH AUTOMATIC TIRE INFLATION SYSTEMS

CROSS-REFERENCE TO RELATED APPLICATIONS

This is a continuation-in-part of application Ser. No. 10/457,793 filed on Jun. 9, 2003 now U.S. Pat. No. 6,938,658 and entitled "Expandable Spindle Plug Assembly For Use With Automatic Tire Inflation Systems".

BACKGROUND OF THE INVENTION

The present invention is directed to a spindle plug assembly for communicating pressurized air through an axle spindle to a rotary union assembly. Automatic tire inflation systems, also known as central tire inflation systems, are commonly used on tractor trailers and utilize compressed air as a source of pressurized air to fill a leaking tire while the trailer is in motion. The use of such inflation system is not limited to tractor trailers, however, but can be employed on any non-driven axle. References is made herein to tractor trailers as that is the most common use of such systems.

In an automatic tire inflation system, air is directed from the control box to the leaking tire through one of the trailer's axles, which either carries an air line from the control box, or is sealed and functions as an air conduit. Pressurized air carried by the axles communicates with each pair of trailer tires mounted thereon through a plug assembly located at the end of the pressurized axle. The pressurized air is communicated through a rotary union assembly, which in turn directs the air to valve stems on the rotating tires. A preferred rotary union assembly is disclosed in U.S. Pat. No. 6,105,645 entitled "Rotary Union Assembly For Use In Air Pressure Inflation Systems For Tractor Trailer Tires", issued to Anthony L. Ingram. Applicant incorporates herein by reference the specification therein. Between each rotary union assembly and its associated tires, pressure responsive valves are employed so that upon the occurrence of a leak in one of the tires, the resulting pressure loss will cause one of the valves to open and allow air flow from the rotary union assembly to pass therethrough to the leaking tire.

A plug filter assembly located at the end of the pressurized axle communicates pressurized air carried by the axles to each pair of trailer tires mounted thereon through the rotary union assembly by which air flow is directed from a stationary air line to the valve stems on the rotating tires. The pressurized air in the axles communicates with the plug filter assembly, through an air passage which extends through the assembly into the pressurized axle, on the one end, and into the wheel lubrication compartments adjacent to the ends of the axles on the other end. The pressurized air is then communicated with each pair of trailer tires mounted thereon through the rotary union assembly.

While these central tire inflation systems are well known and in widespread use, communication between the pressurized air in the hollow axle spindles and the plug filter assembly has suffered several shortcomings. For example, press plug air passage tube systems frequently employ a cone shaped press plug with an outside o-ring seal that must be forcibly installed in the spindle end of the axle. This can cause damage to the o-ring seal and the interior wall of the spindle during installation. When the o-ring is damaged, the seal is compromised which can allow air into the wheel lubrication compartment. Any air leakage into the wheel lubrication compartment causes air pressure build up within the compartment which can damage the oil seals therein and create an oil leak. If the wheel bearings lose their lubrication, they will seize up and can cause a fire.

Press plug removal for maintenance or cleaning of the axle presents another problem. The interior of a trailer axle accumulates moisture from the air passing therethrough which causes rusting, creating debris in the form of rust particles within the axle that will clog the filter. The press plug must be forcibly removed to clean out the axle and prevent continued plugging of the filter carried thereby. The filter element must also be periodically cleaned or replaced. The removal of the press plug can not only destroy the press plug, it can damage the interior of the spindle to such an extent that it will not properly seal about a new press plug thus preventing a central tire inflation system being used on that axle in the future.

In response to these needs, a novel press-expansion plug filter assembly was developed that overcame many of the existing problems. That assembly is the subject of U.S. Pat. No. 6,394,556. It employed threaded fasteners that, upon tightening, effected expansion of a plastic head portion of the assembly against the interior wall of the axle spindle to removeably secure the assembly in place within the spindle. The assembly also included a threaded receptacle in the upstream end of a tubular body portion to which a filter element was threadably secured. To remove the device to clean the axle and/or clean or replace the filter, it was only necessary to loosen the threaded fasteners. While that assembly represented a significant advancement in the art, a certain degree of care was required in re-securing the plug assembly. If the fasteners were unevenly torqued, the securement of the press plug assembly within the spindle and the seal created therewith could be adversely affected. If the fasteners were not adequately torqued, neither a proper seal or securement would be obtained. If the fasteners were over torqued the assembly could be damaged as the head portion required the use of an expansible material such as plastic.

It would be highly desirable if a spindle plug assembly could be developed which retained the advantages of this previously patented structure but which could be more easily and quickly installed; and could be installed without the need for special tools and without regard to relatively narrow torque specifications. It would also be desirable if such an assembly obviated the need to employ expandable materials, which are more susceptible to damage, and could be constructed of the same durable steel as the axle spindle. This would not only enhance the durability of the assembly, but avoid differences in coefficients of expansion and contraction between the various components of the plug assembly and the axle spindle which can adversely impact the seal formed between the plug assembly and axle spindle. The expansion plug of the present invention obtains these results.

SUMMARY OF THE INVENTION

Briefly, the spindle plug assembly of the present invention is inserted into the axle spindle wherein the assembly is sealably secured against the interior wall of the axle spindle by an external o-ring to form an airtight seal about the assembly. An expandable securing ring defined by a plurality of steel ring segments is provided on the assembly in axial alignment with the o-ring seal for engagement with the interior wall of the axle spindle. Upon tightening a single conventional threaded fastening member, the ring segments are expanded radially into engagement with the interior spindle wall to effect a tight securement of the plug assembly within the axle spindle. For applications in which the interior of the axle is pressurized and acts as an air conduit, the plug assembly of the present invention carries a filter element to remove foreign matter such as rust particles, dust and debris from the air flow passing therethrough to the rotary union. In those applications in which the pressurized air passes from its source through an air flow tube in the axle, the spindle plug of the present invention provides an airtight seal with the tube for directing the pressurized air from the tube through the spindle to the rotary union.

DETAILED DESCRIPTION OF THE PREFERRED EMBODIMENTS

Referring now in detail to the drawings, the spindle plug assembly 10 of the present invention, while usable with automatic tire inflation systems on a wide variety of movable vehicles employing stationary axles with hollow spindles, is particularly adapted for use on tractor trailers. Accordingly, the assembly 10 will be described in conjunction with a stationary trailer axle 12. While identical spindle plug assemblies 10 are provided at the end of each axle on the trailer to communicate with a rotary union (not pictured) to maintain the inflation pressure of the tires carried thereby, reference will be made to only one such assembly 10 and the axle spindle 14 in which it is installed.

Figures 3, 4, 5, 6:
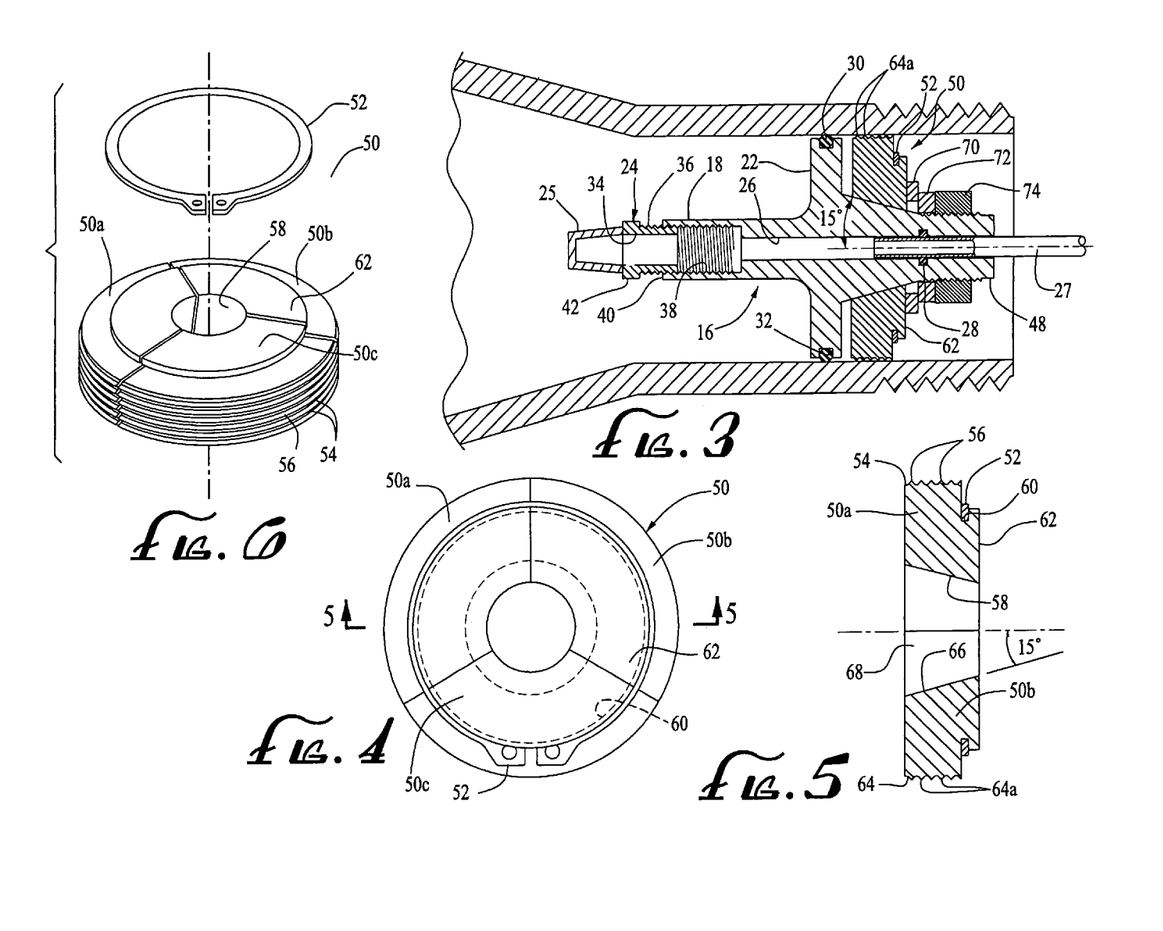
FIG. 3 is a section side view of the expansion plug filter assembly of FIG. 1 shown mounted inside an axle spindle.
FIG. 4 is an end view of the expansion plate and securement ring employed in the present invention.
FIG. 5 is a section view taken along the line 5—5 of FIG. 4.
FIG. 6 is an exploded view of the expansion plate and securement ring employed in the present invention.

The spindle plug assembly 10 comprises an arbor 16 having an upstream portion 18, a downstream portion 20 and a circular flange 22 projecting radially between arbor portions 18 and 20. The arbor 16 and flange 22 are of single-piece construction, preferably forged from steel having a hardness of about HT 45–52HRC, which is about the same hardness as the steel commonly used in trailer axle spindles. The parts could also be molded of pressed metal. In the embodiment of the invention illustrated in FIGS. 1–6, the upstream portion 18 of arbor 16 has a filter element 24 secured thereto such that during use, the pressurized air in the hollow trailer axle will pass through the filter element 24, through the air flow channel 26 defined by the interior of arbor 16, and into a tube 27 that extends from the downstream end of channel 26 to the rotary union housing as described in U.S. Pat. No. 6,105,645. An o-ring 28 is provided in interior end of the downstream portion 20 of arbor 16 to provide an airtight seal about the exterior surface of the tube communicating with the rotary union. An external o-ring 30 is provided in an annular groove 32 formed in the perimeter of circular flange 22 to provide an airtight seal between the spindle plug assembly 10 and the interior wall of the axle spindle 14 as shown in FIG. 3.

To secure the filter element 24 in the upstream portion 18 of arbor 16, the filter 25 portion thereof, which preferably formed of a cellular sintered metal structure and has a mesh size of about 10–40 microns, is mounted on the upstream end of a hollow tubular member 34. In the embodiment of the spindle plug assembly 10 illustrated in FIGS. 1–6, filter element 24 is provided with external threads 36 that are adapted for threaded engagement with internal threads 38 formed in the upstream end 40 of the arbor 16. A plurality of flat wrench engaging surfaces 42 are also defined by tubular member 34 adjacent filter 25 to facilitate securement of the filter element. Such a filter element is marketed under the name Breather Vent by Berendsen Fluid Power in Tulsa, Okla. It is to be understood that other configurations of filter elements, filtering materials and means of securement of the element could be employed in the present invention.

The exterior of the downstream portion 20 of arbor 16 adjacent circular flange 22 defines a conical or tapered portion 44 terminating at its downstream end in a threaded cylindrical portion 46. Threaded portion 46 terminates at its downstream end in a plurality of flat wrench engaging surfaces 48. The exterior of the upstream portion 18 of arbor 16 is preferably cylindrical to facilitate manufacture, but could be of any desired shape.

To physically secure the spindle plug assembly 10 within the axle spindle 14, a split ring locking assembly 50 is employed. Assembly 50 comprises three separate and equal segments 50a–50c held together by a radially expandable flat, metal, split ring retention spring 52. As seen in FIG. 6, each of the segments of the ring assembly 50 defines a constant radius outer surface 54 spanning an arc of 120° and defining a plurality of sharp circumferential ridges 56 therein, a curvilinear inclined inner surface 58, an arcuate recessed area 60 inwardly spaced and rearwardly adjacent outer surface 54 and a circular base portion 62. Upon aligning and securing together the segments 50a–50c with spring 52, the split ring locking assembly 50 is defined. Upon being so aligned and secured, the split ring locking assembly 50 defines a constant radius outer annular surface 64 having a plurality of axially-spaced circumferentially extending sharp cutting ridges 64a formed therein and a frustoconical inner surface 66 disposed about a tapered opening 68. Inner surface 66 defines a taper angle of about 15° with respect to the central axis X of the ring locking assembly 50 (see FIG. 5). This is the same angle as that defined by the tapered portion 44 of arbor 16 with respect to the central longitudinal axis of the arbor passing through channel 26.

The segments 50a–50c of the split ring locking assembly, like arbor 16, are preferably forged of 4140 steel and define a constant radius of a size such that the resultant diameter of the locking ring assembly 50 is equal to the diameter of circular flange 22 without the o-ring 30 being mounted thereon and is slightly smaller than the interior diameter of a conventional tractor-trailer axle spindle. By way of example, for an axle spindle having an internal diameter of 2.75 inches, the radius of each ring segment is 1.86 inches such that the diameter of the locking ring assembly 50 would be 2.72 inches. Of course, arbors with different diameter radial flanges and correspondingly sized locking ring assemblies would be provided to fit axle spindles of varying internal diameters. It should also be noted that while the split ring locking assembly preferably is comprised of three segments 50a–50c, two or more than three segments could be employed. Three segments, however, is preferred as that number provides both a very strong and an even distribution of the locking force about the spindle plug assembly.

The split ring locking assembly 50 is disposed on the downstream portion 20 of the arbor 16 such that the annular frustoconical inner surface 66 mates with the tapered portion 44 of arbor portion 20. A flat metal washer 70 is then disposed about the threaded downstream arbor portion 46 of arbor 16 adjacent base portion 62 of locking assembly 50. A conventional lock washer 72 is disposed externally adjacent steel washer 70 and a conventional fastening nut 74 threadably engages the arbor 16 adjacent lock washer 72. Alternatively, the lock washer 72 could be eliminated and the conventional fastening nut 74 replaced with a nylon locking nut (not shown). As nut 74 is tightened about the downstream portion 46 of arbor 16, it presses against the split ring locking assembly 50 and forces assembly 50 upstream along the inclined arbor portion 44, causing the individual ring segments 50a–50c of assembly 10 to move radially outwardly against the force of the split ring retention spring 52 until the sharp ridges 64a on the outer surface of ring assembly 50 abut and dig into the inner steel surface wall of the axle spindle 14, securing the spindle plug assembly in place within the axle spindle. Thus, the use of a single fastener to secure the spindle plug assembly 10 in place within the spindle avoids an uneven seal from being created, which can occur with uneven torquing of multiple fasteners. The split ring retention spring 52 used in the present invention to retain the locking assembly segments 50a–50c in place is available from Meyer Retaining Ring Co. of Milwaukee, Wis. under the designation External Series 5100.

Figure 1:
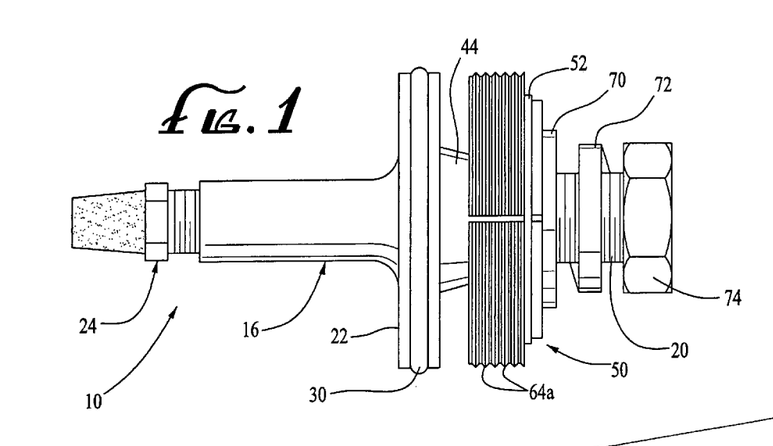
FIG. 1 is a side view of the expansion plug filter assembly according to a first embodiment of the present invention.
Figure 2:
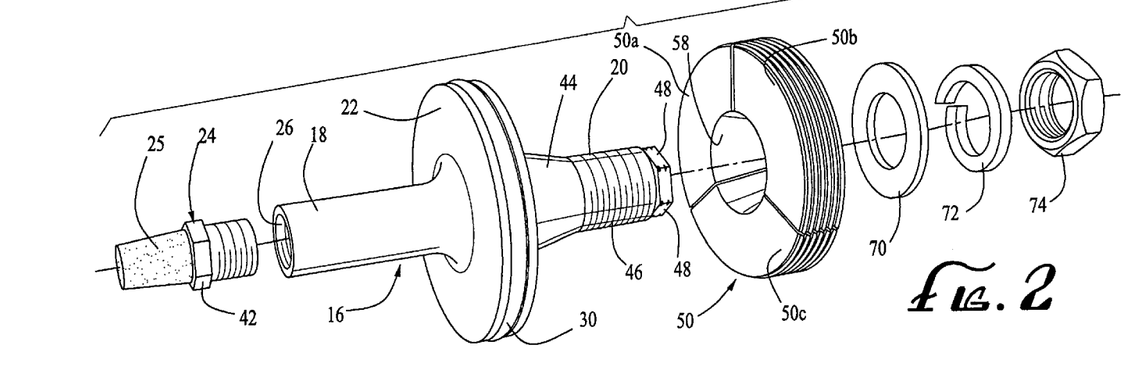
FIG. 2 is an exploded perspective view of the expansion plug filter assembly illustrated in FIG. 1.

In securing the spindle plug assembly 10 as described and as illustrated in FIG. 1, the force with which the fastening nut 74 is tightened about the threaded downstream end of arbor 16 is not critical. Even the slightest tightening of nut 74 beyond the point at which the split ring assembly 50 engages the interior axle spindle wall will secure the spindle plug assembly 10 in place against the force of the pressurized air within the axle acting thereon. With as little as about 30 pounds of torque being exerted on nut 74 after engagement of the split ring assembly with the spindle wall, several thousand pounds of force would be required to dislodge the spindle plug assembly 10 from the axle spindle. In addition, the configurations and cooperation of the arbor 16 and split ring locking assembly 50 and the hardened steel of which these components are constructed make it very difficult to over-torque the fastening nut 74 to the point that either the plug assembly 10 or axle spindle 14 would be severely damaged. If over-torquing were to occur, the threads on the fastening nut would simply be stripped. To remove the spindle plug assembly from the axle spindle, it is only necessary to loosen fastening nut 74 and tap lightly on the arbor 16, whereupon the split ring locking assembly 50 will travel down the tapered portion 44 of the arbor such that the plug assembly can be easily pulled from the spindle. Thus, the spindle plug assembly 10 of the present invention provides a stationary fitting and seal in the axle spindle for the air flow tube 27 that unlike the plug 26, fitting 30 and seal 34 disclosed in U.S. Pat. No. 6,105,645, provides a readily replaceable filter element for protecting the rotary union assembly from foreign matter in the air flow passing therethrough.

For those applications in which the axle is not pressurized but houses an air conduit, preferably a flexible tube, for communicating the source of pressurized air with the rotary union, the filter element 24 is not employed. Instead, the tube 100 (see FIG. 7) carrying the pressurized air from its source is provided with a fitting 102 that threadably engages the threads formed in the upstream end 40 of the arbor 16. Thus, for such applications, the spindle plug assembly of the present invention provides the desired communication between the air tube and the rotary union.

In such non-sealed axle applications, it is not absolutely necessary that an airtight seal be provided between the axle spindle and the air flow tube 27 as the axle itself is not pressurized. The air flows from the pressurized source, i.e., a conventional air compressor on the tractor, to the rotary union through a sealed tube disposed within the axle. However, it may still be desirable to provide such a seal. In the event that tube 27 were to rupture or another form of air leak were to occur upstream of fitting 102 and the spindle plug assembly did not form an airtight seal with the axle spindle wall, an air pressure buildup within the axle would result unless the axle interior were vented to the atmosphere. A pressure buildup within the axle would cause air to leak into the wheel lubrication compartment within the attached hub cap, causing a pressure buildup therein which could damage the oil seals and create an oil leak. If the wheel bearings were to then loose their lubrication, they will seize up and could cause a fire. However, by providing an airtight seal with the interior spindle wall, the flange 22 and o-ring 30 carried thereby prevent such an occurrence. Pressurization of the axle will prevent air from leaking into the lubrication compartment and by so doing, will reestablish the air flow through the leaking tube 27, allowing the rotary union assembly to function in its intended manner. If the axle were vented to the atmosphere so that such a tube rupture or leakage could not pressurize the axle, the spindle assembly 10 of the present invention would still prevent pressurization of the lubrication compartment of the wheel whereas without the seal provided by flange 22, pressurization could still occur, depending on the size of the leak and the ability of the axle to vent air. For those applications in which the interior of the axle is adequately vented, weep holes 23 (see FIG. 7) could be provided in the flange 22 such that any pressure buildup within the lubrication compartment resulting from a leak in the rotary union would allow air to vent from the lubrication compartment back through the weep holes into and out of the axle, thereby preventing pressurization of the lubrication compartment. Thus, the spindle plug assembly 10 of the present invention is highly useful in non-pressurized axle applications as well as pressurized applications.

Figures 7, 8, 9:
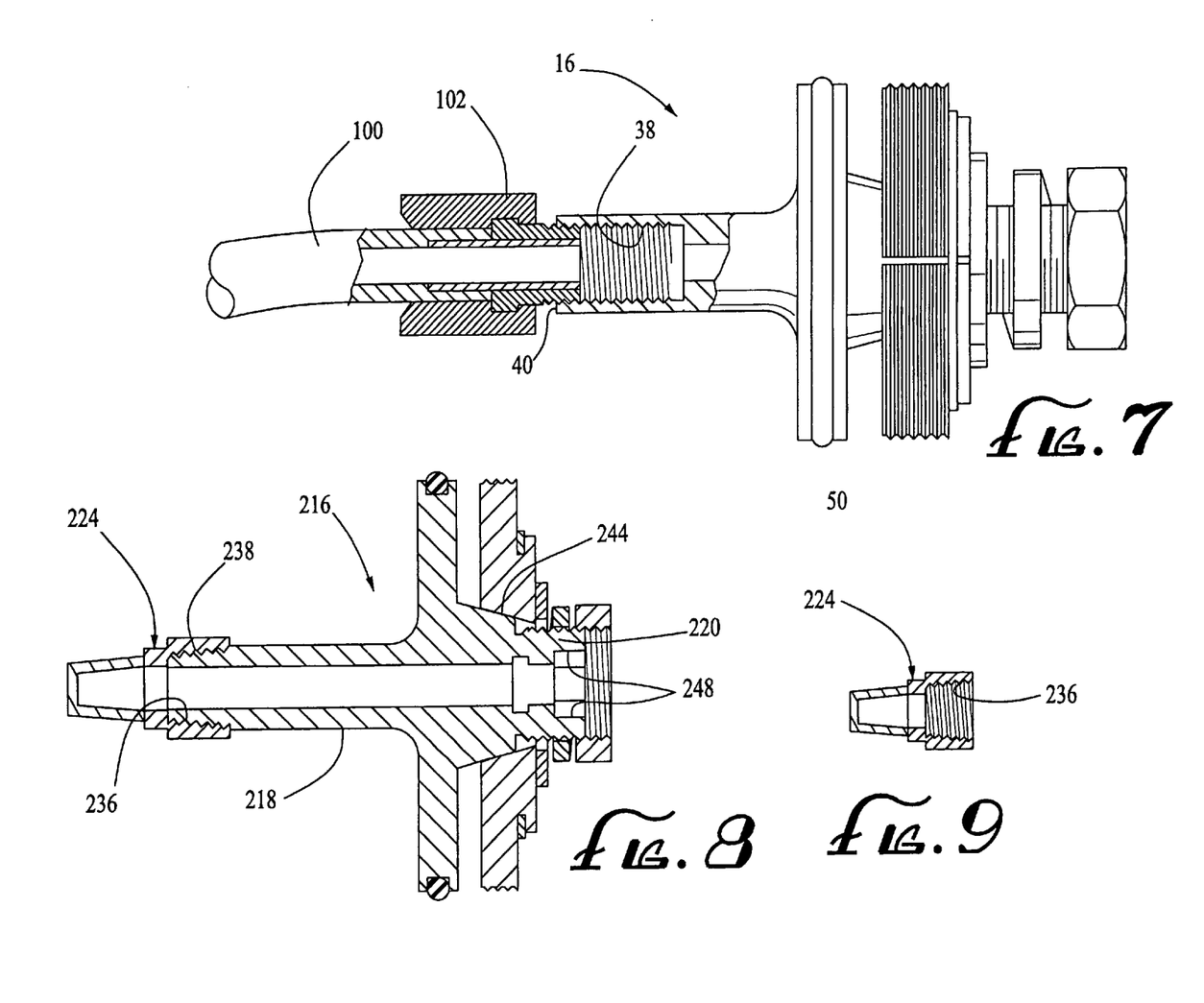
FIG. 7 is a sectional side view of a modified form of the present invention.
FIG. 8 is a sectional view of a second and improved embodiment of the arbor employed in the present invention.
FIG. 9 is a sectional view of a filter element adapted for use with the arbor illustrated in FIG. 8.

A second arbor configuration for use in the present invention is illustrated in FIG. 8. The arbor 216 shown therein differs from the arbor 16 of the prior embodiment in that the axial length of the downstream portion 220 of arbor 216 is somewhat shorter than portion 20 of arbor 16, and the flat wrench engaging surfaces 48 of the prior embodiment have been replaced with internal flat surfaces 248 disposed in a hex configuration and adapted to be engaged by an Allen wrench. The length of the tapered or inclined portion 244 of arbor 216 has also been shortened somewhat with respect to the tapered portion 44 of arbor 16. While the length of the upstream portion 218 of arbor 216 remains unchanged, the interior threads 38 in the upstream end thereof have been replaced with exterior threads 238 to reduce the cost of manufacture. Accordingly, the filter element 224 carried by arbor 216 provides internal threads 236 in the tube portion 234 of the filter element to engage the exterior threads 238 on the upstream end of arbor 216. Such a filter element is illustrated in FIG. 9 and as with filter element 24, also is available from Berendsen Fluid Power. Similarly, when used with non-pressurized axles carrying an air tube, the fitting on the downstream end of the tube would be provided with a fitting having internal threads to engage the external threads 238 on the upstream end 240 of arbor 16.

Figures 10, 12:
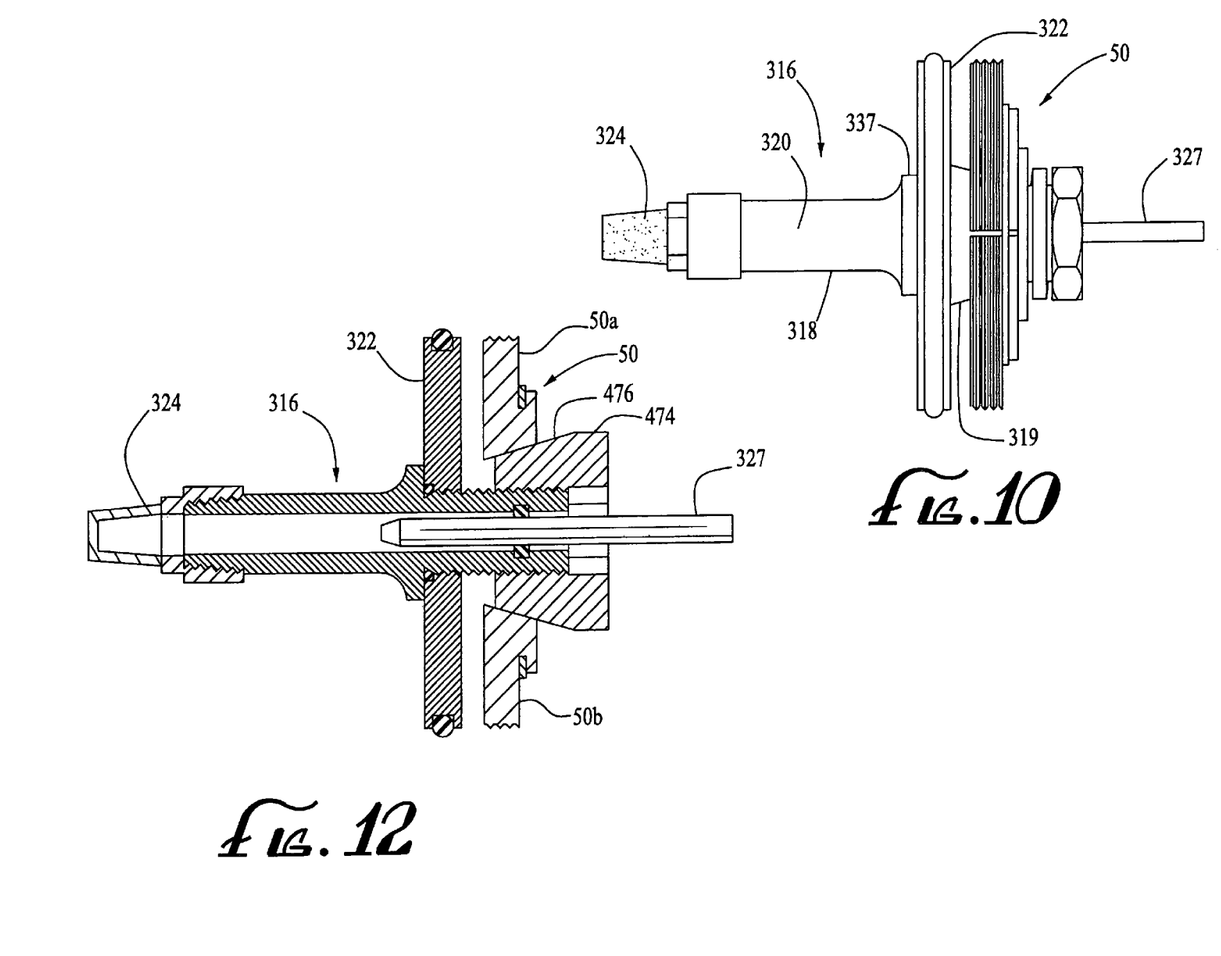
FIG. 10 is a side view of a third and preferred embodiment of the arbor employed in the present invention.
FIG. 12 is a sectional side view of yet another embodiment of the present invention.
Figure 11:
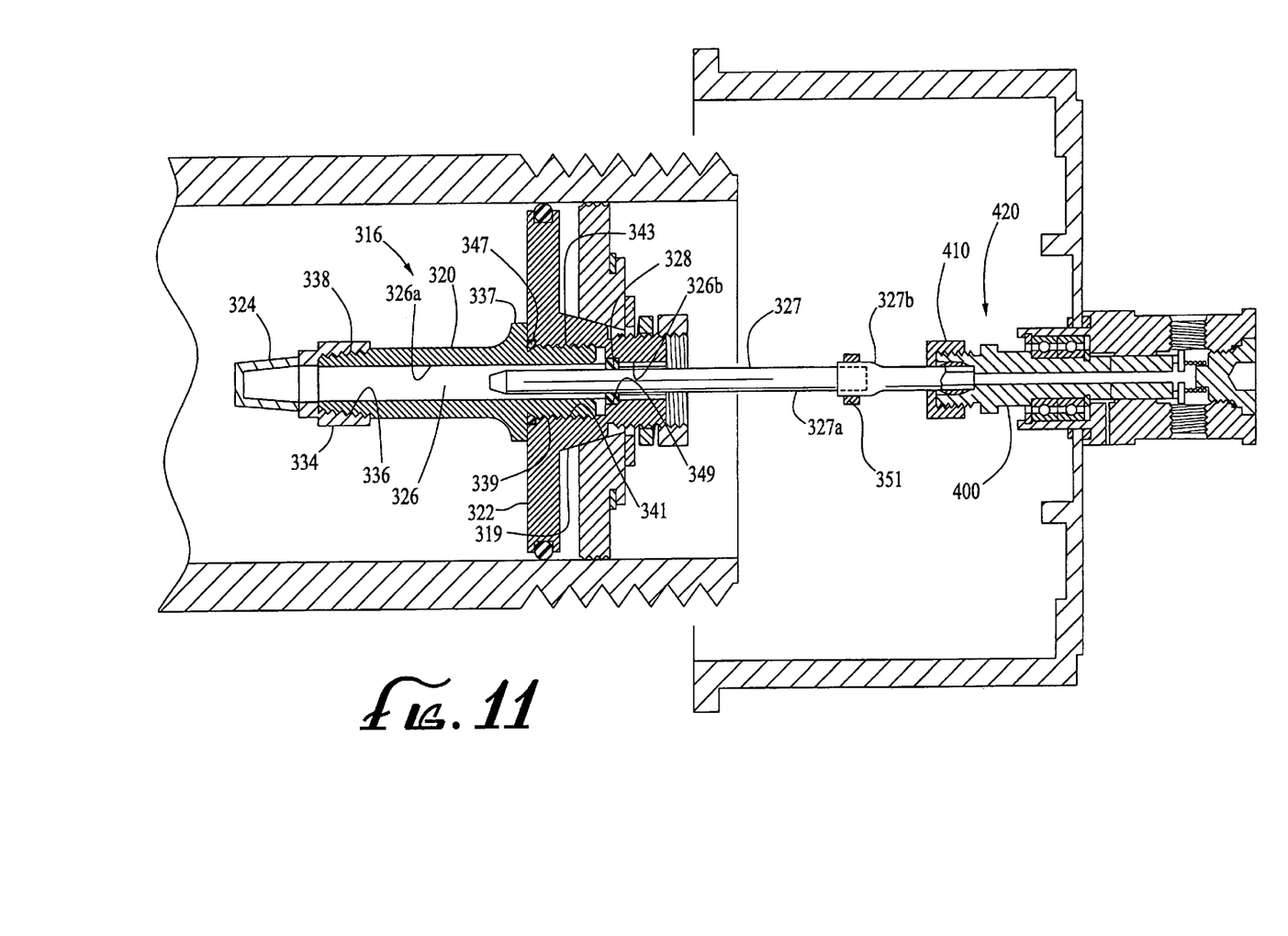
FIG. 11 is a sectional side view of the expansion plug filter assembly employing the arbor of FIG. 10 and shown mounted inside an axle spindle and operatively connected with a rotary union assembly.

A third and preferred arbor configuration employed in the spindle plug assembly of the present invention is illustrated in FIGS. 10 and 11. The arbor 316 shown therein is of the same general configuration as that illustrated in FIG. 8 but differs from both prior arbor embodiments in that arbor 316 is of two-piece construction. Arbor 316 comprises an upstream portion 318 and a downstream portion 319, both preferably formed of the same steel as arbors 16 and 216. The upstream portion 318 of arbor 316 is very similar in configuration to the upstream portion 218 of arbor 216 (see FIG. 8) and defines a tubular body portion 320, a central channel 326a extending axially therethrough and exterior threads 338 on the upstream end thereof which engage the internal threads 336 in the tube portion 334 of the filter element 324. Filter element 324 is preferably identical to filter element 224. The upstream end of arbor portion 318 defines a radially projecting abutment flange 337 and a threaded reduced diameter portion 339 extending axially therefrom.

The downstream portion 319 of arbor 316 is very similar to the downstream portion of arbor 216 except that it is formed as a separate piece as opposed to being integrally formed with the upstream portion of the arbor. Downstream portion 319 is provided with internal threads 341 at its upstream end extending about axially extending channel 326b. Threads 341 threadably engage threads 343 on the reduced diameter portion 339 of the upstream portion of arbor 316 so as to communicate channel 326b with channel 326a therein and define a continuous arbor channel 326 as in the prior embodiments above-described. An o-ring, 347 is provided about the threaded portion 339 of the arbor 316 adjacent the abutment flange 337 thereon so as to form an airtight seal between flange 337 and the inner portion of circular flange 322 as seen in FIG. 11. A seat 349 is provided in channel 326b and an o-ring 328 is disposed adjacent seat 349 to form an airtight seal with the exterior surface of the tube communicating with the rotary union as in the prior embodiments. The remainder of the upstream portion of arbor 316 is of the same configuration as the upstream portion of arbor 216 of the prior embodiment.

FIG. 11 illustrates the use of arbor 316 in the expansion plug assembly of the present invention in a pressurized axle application in which the tube 327 that extends from the spindle plug assembly to the rotary union housing 400 comprises an upstream rigid portion 327a and a downstream flexible portion 327b. The rigid portion 327a of the tube is preferably formed of stainless steel and extends through the interior o-ring seal 328. The flexible portion 327b of the tube is secured to the rigid portion by compression ring 351 and extends downstream from ring 351 to the air inlet fitting 410 of the rotary union assembly 420 carried by rotatable housing 400 as illustrated in FIG. 11. A similar communication between a flexible tube and the rotary union is discussed in detail in U.S. Pat. No. 6,105,645. Compression ring 351 is located downstream of the interior o-ring seal 328 in arbor portion 319. The axial spacing of ring 351 from seal 328 is variable depending upon the particular application (wheel design) which determines the axial spacing between the o-ring seal 328 and the rotary union assembly. The preferred rotary union assembly used with the expandable spindle plug assembly of the present invention is mounted exteriorly of the hub cap end wall so as to position the rotary union out of the lubrication compartment of the wheel as described in the aforementioned U.S. Pat. No. 6,105,645. Different wheels have very different spacings between the ends of the axle spindle and the hub cap end wall. Such spacings typically vary from about 1.0–4.0 in. and are accommodated by tube 327 being axially translatable within the fixed o-ring seal 328. The axial spacing of compression ring 351 from seal 328 varies from about 0.025 in. to about 2.5 in. By providing tube 337 with an overall length of about 3.5 in. comprised of a rigid portion 327a of about 3.0 in. in length and a flexible portion of about 0.5 in. in length, the expansion plug assembly 10 can readily accommodate all conventional variations in wheel design.

As a result of the above-described two-piece construction of tube 327, any misalignment between the stationary spindle plug assembly 10 (or axle spindle) and the rotary union 420 in rotatable housing 400 is readily accommodated by the downstream flexible portion 327b of the tube misalignment can result from improper mounting of the hub cap on the wheel, the spindle plug assembly in the axle spindle or axle imperfections. The rigid steel upstream portion 327a of the tube 327 that extends through and is in sealing engagement with o-ring seal 328 prevents the outer diameter of the air flow tube from wearing or even collapsing under the sealing engagement of the o-ring 328 which could otherwise occur with a flexible plastic tube.

The above-described two-piece arbor configuration has been found to reduce the cost of both the manufacture and installation of the spindle plug assembly as compared to assemblies employing the single-piece arbors of the prior embodiments. The two-piece configuration allows the interior o-ring seal 238 to be readily inserted against seat 349 into the downstream portion 319 of arbor 318. Not only is this a far simpler installation task than required with the interior seal in the single-piece arbor, the two-piece construction also eliminates the need for an additional washer and snap ring used in the single-piece embodiment. The two-piece construction also reduces the cost of manufacture by allowing the upstream portion 318 of arbor 316 to be of a constant size and configuration for differently-sized axle spindles. Only the downstream arbor portion need be changed, further reducing material cost.

Figures 13, 14:
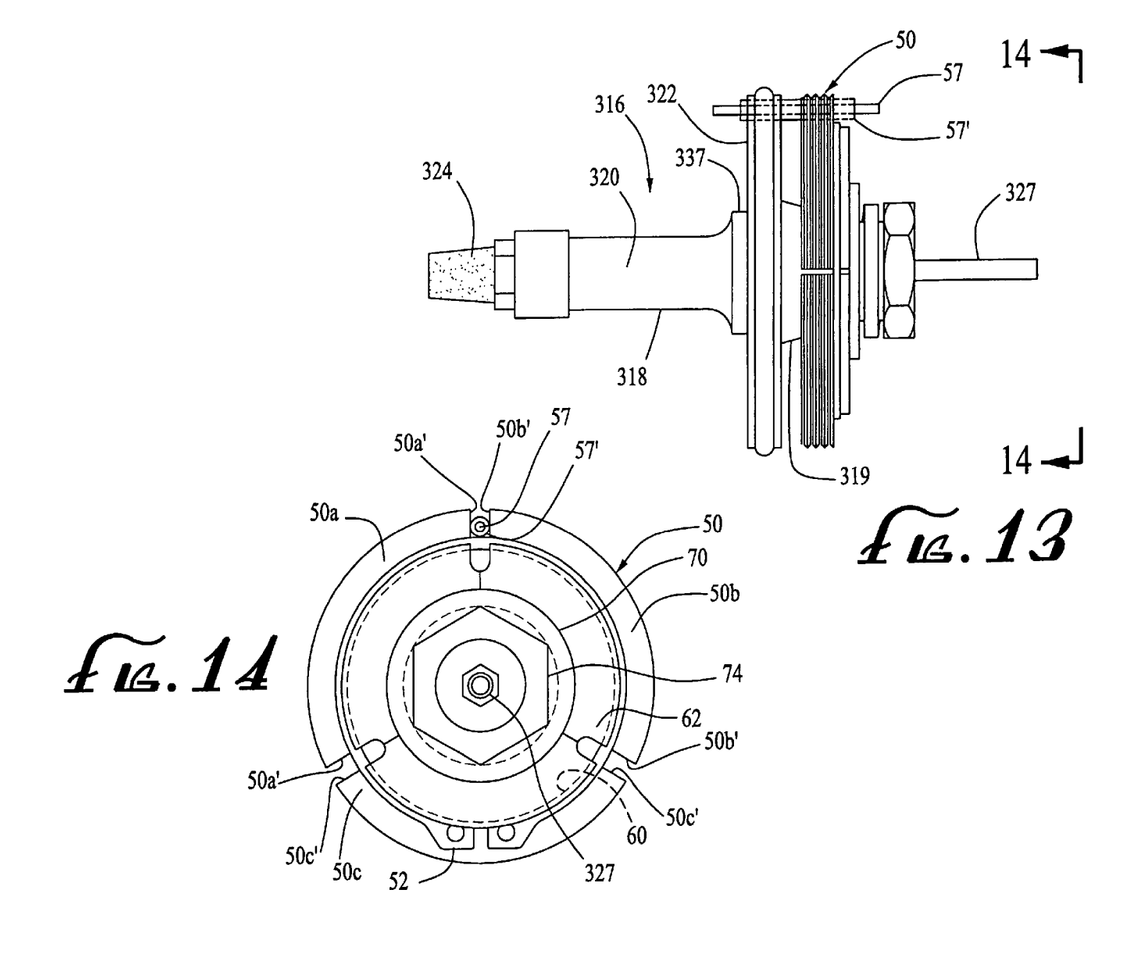
FIG. 13 is a side view of the embodiment of the invention illustrated in FIG. 10 including an electrically conductive rod extending through the assembly for establishing electrical communication with the wheel assembly through the vehicle axle.
FIG. 14 is an end view of the filter plug assembly illustrated in FIG. 13 as seen from line 14—14 in FIG. 13.

In some axle assemblies, electrical wires communicate with the wheel assemblies through the interior of the axles. For example, an automatic braking system may be controlled by a centralized device which communicates with the wheels by means of wires extending through axle interiors. The present invention allows communication of electrical current from the interior of the axle spindle to the wheel assembly across the spindle plug assembly via one or more electrically conductive rods 57 (see FIG. 13). The rods (one being shown) would be covered intermediary of their ends by an insulating sheath 57', preferably formed of a suitable plastic material. The rod or rods 57 would be carried by and extend through the circular flange 22 or 322 of the assembly and through opening(s) in the ring assembly 50. For example, cutout or relief areas 50a', 50b' and 50c' could be provided in the outer side portions of each of the segments such that when the segments are in adjacent juxtaposition as seen in FIG. 14 or even when urged further apart by the inclined arbor portion 44, openings are defined to accommodate one or more of the conductor rods. Suitable electrical terminal connections (not shown) can be formed in or attached to the upstream and downstream ends of conductive rod(s) 57.

Various other changes and modifications may also be made in carrying out the present invention without departing from the spirit and scope thereof. For example, the radial flange or the inclined portion of the arbor could be formed as a separate piece and secured in place on the hollow arbor or, as shown in FIG. 12, formed as an upstream portion of the fastening nut. As seen in FIG. 12, the conventional threaded fastening nut 74 employed in the prior embodiments is replaced with a nut 474 having a frustoconical outer surface 476 that engages the correspondingly inclined interior surface on the locking member and moves the individual ring segments 50a–50c outwardly to engage the spindle wall as the nut 474 is tightened on to the arbor. Also, while it is preferred that the inclined portions 44 and 244 of the arbor be adjacent the radial flange, as shown in the drawings, so as to position the locking ring assembly 50 and radial flange in close proximity. The inclined portion could be axially spaced from the flange so as to be proximate the flange and still provide an operable securement. The term "proximate" as used in the claims is intended to mean and include an adjacent juxtaposition as shown in the drawings as well as a slight separation of the flange and locking ring assembly. Insofar as these and other changes and modifications are within the purview of the appended claims, they are to be considered as part of the present invention.

We claim:

1. A spindle plug assembly adapted to be mounted in an axle spindle for communicating a source of pressurized air through the axle with a rotary union assembly in a tire inflation system, said spindle plug assembly comprising:
    an arbor defining an upstream portion and a downstream portion threadably engaging said upstream portion, said portions defining an air flow channel extending axially through said arbor, an outwardly projecting radial flange defined by one of said arbor portions adjacent the other of said portions and an axially extending inclined portion defined by one of said portions so as to be proximate said flange;
    a sealing member carried by said radial flange for engaging an axle spindle and forming an airtight seal therebetween;
    a locking assembly disposed about said inclined portion of said arbor, said locking assembly moving radially outwardly upon said locking assembly being axially moved along said inclined portion of said arbor toward said flange, whereby said assembly engages the axle spindle and secures said spindle plug assembly in place within said spindle; and
    a fastening member engaging said arbor adjacent said locking assembly and moving said locking assembly along said inclined portion of said arbor upon said fastening member being tightened about said arbor.

2. The assembly of claim 1 wherein said fastening member is in threaded engagement with said downstream portion of said arbor.

3. The assembly of claim 1 including a filter element removably secured to said upstream portion of said arbor.

4. The assembly of claim 3 wherein said filter element threadably engages said upstream portion of said arbor.

5. The assembly of claim 1 wherein each of said arbor portions is of single-piece construction and said radial flange defines a circular perimeter portion having a groove therein, said sealing member being carried in said groove.

6. The assembly of claim 5 wherein said sealing member is an o-ring.

7. The assembly of claim 1 wherein said locking assembly is a split ring locking assembly comprising a plurality of arcuate segments and an expansible retention member urging said segments into adjacent juxtaposition, said segments moving radially outwardly against said retention member upon said locking assembly being moved along said inclined portion of said arbor towards said flange whereby said segments engage the axle spindle and secures said plug assembly in place within said spindle.

8. The assembly of claim 7 wherein said fastening member is in threaded engagement with said downstream portion of said arbor.

9. The assembly of claim 7 wherein said segments each define an inner curvilinear surface and an outer curvilinear surface, said inner curvilinear surface being tapered and adapted to mate with said inclined surface on said arbor, said outer curvilinear surface defining a plurality of pointed contact surfaces thereon adapted to abut and engage the axle spindle upon said split ring locking assembly being moved along said arbor by said fastening member and said segments of said locking assembly being moved into engagement with the axle spindle.

10. The assembly of claim 9 wherein said pointed contact surfaces on said outer curvilinear surfaces of said segments are aligned so as to define a plurality of parallel ridges extending about said split ring locking assembly.

11. The assembly of claim 2 including a second sealing member carried by said arbor, said second sealing member extending about said air flow channel within said arbor.

12. The assembly of claim 7 including a second sealing member carried by said arbor, said second sealing member extending about said air flow channel within said arbor.

13. The assembly of claim 12 wherein said pointed contact surfaces on said outer curvilinear surfaces of said segments are aligned so as to define a plurality of parallel ridges extending about said split ring locking assembly.

14. The assembly of claim 13 wherein said segments each define an inner curvilinear surface and an outer curvilinear surface, said inner curvilinear surface being tapered and adapted to mate with said inclined surface on said arbor, said outer curvilinear surface defining a plurality of pointed contact surfaces thereon adapted to abut and engage the axle spindle upon said split ring locking assembly being moved along said arbor by said fastening member and said segments of said locking assembly being moved into engagement with the axle spindle.

15. The assembly of claim 14 wherein said pointed contact surfaces on said outer curvilinear surfaces of said segments are aligned so as to define a plurality of parallel ridges extending about said split ring locking assembly.

16. The assembly of claim 1 including an annular sealing member carried by one of said portions of said arbor and extending about said air flow channel extending through said arbor and a tubular member carried by said arbor for communicating said air flow channel with the rotary union assembly, said tubular member including an upstream rigid portion and a downstream flexible portion, said rigid portion extending through said annular sealing member so as to form an airtight seal therewith and said flexible portion allowing for misalignment between said spindle plug assembly and said rotary union assembly.

17. The assembly of claim 16 wherein said tubular member is axially translatable with respect to said arbor to accommodate variations in axial spacing between the axle spindle and rotary union assembly.

18. The assembly of claim 16 including a filter element removably secured to said upstream portion of said arbor.

19. The assembly of claim 16 wherein said fastening member is in threaded engagement with said downstream portion of said arbor.

20. The assembly of claim 17 including a filter element removably secured to said upstream portion of said arbor.

21. A spindle plug assembly adapted to be mounted in an axle spindle for communicating a source of pressurized air through the axle with a rotary union assembly in a tire inflation system, said spindle plug assembly comprising:
    an arbor defining an upstream portion and a downstream portion threadably engaging said upstream portion, said portions defining an air flow channel extending axially through said arbor, an outwardly projecting radial flange defined by one of said arbor portions adjacent the other of said portions and an axially extending incline portion defined by one of said portions so as to be proximate said flange;
    a sealing member carried by said radial flange for engaging an axle spindle and forming an airtight seal therebetween;
    a split ring locking assembly disposed about said inclined portion of said arbor, said locking assembly comprising of a plurality of arcuate segments and an expansible retention member urging said segments into adjacent juxtaposition, said segments moving radially outwardly against said retention member upon said locking assembly being axially moved along said inclined portion of said arbor toward said flange, whereby said segments engage the axle spindle and secure said spindle plug assembly in place within said spindle; and
    a fastening member threadably engaging said arbor adjacent said split ring assembly and moving said split ring assembly along said inclined portion of said arbor upon said fastening member being tightened about said arbor.

22. The assembly of claim 21 including a filter element removably secured to said upstream portion of said arbor.

23. The assembly of claim 22 wherein said filter element threadably engages said upstream portion of said arbor.

24. The assembly of claim 21 wherein each of said arbor portions is of single-piece construction and said radial flange defines a circular perimeter portion having a groove therein, said sealing member being carried in said groove.

25. The assembly of claim 21 wherein said arbor portions are each of single-piece construction and formed of steel.

26. The assembly of claim 21 wherein said segments each define an inner curvilinear surface and an outer curvilinear surface, said inner curvilinear surface being tapered and adapted to mate with said inclined surface on said arbor, said outer curvilinear surface defining a plurality of pointed contact surfaces thereon adapted to abut and engage the axle spindle upon said split ring locking assembly being moved along said arbor by said fastening member and said segments of said locking assembly being moved into engagement with the axle spindle.

27. The assembly of claim 26 wherein said pointed contact surfaces on said outer curvilinear surfaces of said segments are aligned so as to define a plurality of parallel ridges extending about said split ring locking assembly.

28. A spindle plug assembly adapted to be mounted in an axle spindle for communicating a source of pressurized air through the axle with a rotary union assembly in a tire inflation system, said spindle plug assembly comprising:
    an arbor defining an upstream portion, a downstream portion, an air flow channel extending axially therethrough, an annular sealing member disposed within said arbor about said channel, an outwardly projecting radial flange intermediary of said portions and an axially extending inclined portion proximate said flange;
    a sealing member carried by said radial flange for engaging an axle spindle and forming an airtight seal therebetween;
    an expansible locking assembly disposed about said inclined portion of said arbor, said locking assembly expanding in a radial direction in response to being moved linearly along said inclined portion of said arbor for engaging the axle spindle and securing said spindle plug assembly in place within said spindle;
    means for selectively moving said locking assembly along said inclined portion of said arbor to effect radial movement thereof into and out of engagement with the axle spindle; and
    a tubular member carried by said arbor for communicating said air flow channel with the rotary union assembly, said member including an upstream rigid portion and a downstream flexible portion, said rigid portion extending through said annular sealing member so as to form an airtight seal therewith and said flexible portion allowing for misalignment between said spindle plug assembly and said rotary union.

29. The assembly of claim 28 including a filter element removably secured to said upstream end portion of said arbor.

30. The assembly of claim 28 wherein said arbor is of single-piece construction and is formed of steel.

31. The assembly of claim 28 wherein said downstream portion of said arbor threadably engages said upstream portion thereof.

32. The assembly of claim 28 wherein said arbor is of single-piece construction and said radial flange defines a circular perimeter portion having a groove therein, said sealing member being carried in said groove.

33. The assembly of claim 29 wherein said moving means comprises a threaded fastening member mounted on said arbor.

34. The assembly of claim 29 wherein said downstream portion of said arbor threadably engages said upstream portion, said radial flange defines a circular perimeter portion having a groove therein, said sealing member being carried in said groove and wherein said moving means comprises a threaded fastening member mounted on said arbor.

35. A spindle plug assembly adapted to be mounted in an axle spindle for communicating a source of pressurized air through the axle with a rotary union assembly in a tire inflation system, said spindle plug assembly comprising:
    an arbor defining an upstream portion, a downstream portion, an air flow channel extending axially therethrough, an annular sealing member disposed within said arbor about said channel, an outwardly projecting radial flange intermediary of said portions and an axially extending inclined portion proximate said flange;
a sealing member carried by said radial flange for engaging an axle spindle and forming an airtight seal therebetween;
a split ring locking assembly disposed about said inclined portion of said arbor, said locking assembly comprising of a plurality of arcuate segments and an expansible retention member urging said segments into adjacent juxtaposition, said segments moving radially outwardly against said retention member upon said locking assembly being axially moved along said inclined portion of said arbor toward said flange, whereby said segments engage the axle spindle and secure said spindle plug assembly in place within said spindle;
a fastening member threadably engaging said arbor adjacent said split ring assembly and moving said split ring assembly along said inclined portion of said arbor upon said fastening member being tightened about said arbor;
a filter element removably secured to said upstream end portion of said arbor; and
a tubular member carried by said arbor for communicating said air flow channel with the rotary union assembly, said member including an upstream rigid portion and a downstream flexible portion, said rigid portion extending through said annular sealing member so as to form an airtight seal therewith and said flexible portion allowing for misalignment between said spindle plug assembly and said rotary union.

36. The assembly of claim 35 wherein said segments each define an inner curvilinear surface and an outer curvilinear surface, said inner curvilinear surface being tapered and adapted to mate with said inclined surface on said arbor, said outer curvilinear surface defining a plurality of pointed contact surfaces thereon adapted to abut and engage the axle spindle upon said split ring locking assembly being moved along said arbor by said fastening member and said segments of said locking assembly being moved into engagement with the axle spindle.

37. The assembly of claim 35 wherein said tubular member is axially translatable with respect to said arbor to accommodate variations in axial spacing between the axle spindle and rotary union assembly.

38. The assembly of claim 35 wherein said pointed contact surfaces on said outer curvilinear surfaces of said segments are aligned so as to define a plurality of parallel ridges extending about said split ring locking assembly.

39. A spindle plug assembly adapted to be mounted in an axle spindle for communicating a source of pressurized air with a rotary union assembly in a tire inflation system via a flexible conduit extending through and carried by the axle, said spindle plug assembly comprising:
an arbor defining an upstream portion, a downstream portion, an air flow channel extending axially therethrough, an annular sealing member disposed within said arbor about said channel, an outwardly projecting radial flange intermediary of said portions and an axially extending inclined portion proximate said flange;
a fitting carried by said upstream portion of said arbor for communicating said flexible conduit with said air flow conduit in said arbor;
a sealing member carried by said radial flange for engaging an axle spindle and forming an airtight seal therebetween;
an expansible locking assembly disposed about said inclined portion of said arbor, said locking assembly expanding in a radial direction in response to being moved linearly along said inclined portion of said arbor for engaging the axle spindle and securing said spindle plug assembly in place within said spindle;
means for selectively moving said locking assembly along said inclined portion of said arbor to effect radial movement thereof into and out of engagement with the axle spindle; and
a tubular member carried by said arbor for communicating said air flow channel with the rotary union assembly, said member extending through said annular sealing member so as to form an airtight seal therewith and being axially translatable with respect to said annular sealing member.

40. The assembly of claim 39 including at least one aperture in said outwardly projecting radial flange for venting air therethrough to said axle upon the occurrence of an air leak downstream of said flange.

41. The assembly of claim 39 wherein said tubular member includes an upstream rigid portion and a downstream flexible portion, said rigid portion extending through said annular sealing member so as to form said airtight seal therewith and said flexible portion allowing for misalignment between said spindle plug assembly and said rotary union.

42. The assembly of claim 39 including at least one aperture in said outwardly projecting radial flange for venting air therethrough to said axle upon the occurrence of an air leak downstream of said flange.

* * * * *